United States Patent [19]
Wood

[11] 4,064,211
[45] Dec. 20, 1977

[54] LINING OF PASSAGEWAYS

[75] Inventor: Eric Wood, Ossett, England

[73] Assignee: Insituform (Pipes & Structures) Ltd., Horbury Junction, near Wakefield, United Kingdom

[21] Appl. No.: 628,850

[22] Filed: Nov. 5, 1975

Related U.S. Application Data

[63] Continuation-in-part of Ser. No. 611,670, Sept. 9, 1975, abandoned, which is a continuation of Ser. No. 422,694, Dec. 7, 1973, abandoned.

[30] Foreign Application Priority Data

Sept. 25, 1973 United Kingdom ............... 56774/73

[51] Int. Cl.² .............................................. B29C 17/00
[52] U.S. Cl. ........................................ 264/95; 61/72.7; 156/287
[58] Field of Search ................. 156/287, 294, 286; 428/36; 138/DIG. 2, DIG. 7, 141, 97; 264/94, 95; 29/421; 61/72.2, 72.3, 112, 72.4, 72.5-72.7

[56] References Cited

U.S. PATENT DOCUMENTS

| | | | |
|---|---|---|---|
| 2,770,950 | 11/1956 | Collins | 61/112 |
| 2,794,758 | 6/1957 | Harper et al. | 156/287 |
| 3,132,062 | 5/1964 | Lang et al. | 156/287 |
| 3,230,129 | 1/1966 | Kelly | 156/287 |
| 3,511,734 | 5/1970 | Darrow | 138/141 |
| 3,583,169 | 6/1971 | Morgan | 61/112 |
| 3,778,878 | 12/1973 | Bindari | 29/421 |
| 3,927,164 | 12/1975 | Shimabukuao | 156/287 |
| 3,940,942 | 3/1976 | Gower | 61/112 |

*Primary Examiner*—Charles E. Van Horn
*Assistant Examiner*—Jerome W. Massie
*Attorney, Agent, or Firm*—Louis Orenbuch

[57] ABSTRACT

A method wherein a tubular liner is applied to the surface of a passageway such as a tunnel or pipeline bore. The liner may be in the form of a flattened tube of absorbent material such as felt or foam such is impregnated with synthetic resin. The liner is anchored at one end of the passageway and is fed into the passageway being turned inside out as it is so fed in. In order to eliminate friction, the liner, before being turned inside out, is supported buoyantly by liquid which serves to carry the liner.

3 Claims, 8 Drawing Figures

LINING OF PASSAGEWAYS

This application is a continuation-in-part of my earlier application Ser. No. 611,670, filed Sept. 9, 1975, which is now abandoned. That earlier application in turn is a continuation of my parent application Ser. No. 422,694, filed Dec. 7, 1973, which is now abandoned.

This invention relates in general to the lining of passageways and more particularly pertains to a method of lining passageways such as sewers and underground pipes while those structures remain in place. There is a need for a suitable method to restore to use sewers, underground pipes and other conduits which have corroded or crumbled from use or from other causes. Hitherto it was usual to replace such structures even where access to them was difficult and required substantial excavation or removal of intervening material. The invention permits the restoration of such structures while allowing them to remain in place by providing a method for lining the passageway with a rigid and strong shell.

The invention resides in a method of lining passageways in which a flexible tubular member is progressively fed into the passageway and is pressed by fluid pressure against the surface to be lined. The flexible tubular member is of a material that is impregnated with a synthetic resin in the liquid state. Upon hardening, the resin causes the tubular member to form a rigid lining in the passageway. The walls of the passageway are not simply sprayed with a liquid resin to build up a hardened inner shell because solid resin tends to be brittle or to have poor structural strength or to crack under stress or to have other disadvantages which prevent its use in that manner. The resin impregnated material is therefore needed to form a liner having the requisite durability, strength, and impact resistance.

The objective of the invention is to provide a method of lining a passageway in situ with a rigid and durable inner sleeve without requiring the disassembly or dismantling of the passageway. In the practice of the method, a fluid impermeable tube carrying in its interior a tubular member of resin absorbent material impregnated with a settable synthetic resin is introduced into the passageway at one end in such a manner that the impermeable tube and the tubular member evert as they progress into the passageway. To accomplish the eversion, the impermeable tube is anchored at the entrance of the passageway and is then fed through the anchored end into the passageway so that the tube turns inside out as it progresses into the passageway. As it everts, the impermeable member presses the resin impregnated tubular member against the walls of the passageway. Fluid pressure is employed to move the impermeable tube and the resin impregnated tubular member along the passageway and to cause those tubes to evert so that the impregnated member lies between the impermeable tube and the passageway surface. The fluid pressure is produced by at least partially filling the everted impermeable tube in the passageway with liquid so that the uneverted impermeable tube and its enveloped impregnated member are buoyantly supported by he liquid and are able to move along the passageway without appreciable contact between the uneverted portion of the impermeable tube and the everted portion of the impermeable tube. The resin is permitted to set and become hard while the fluid pressure is maintained to cause the everted impermeable tube to hold the resin impregnated liner against the walls of the passageway.

The advantage of buoyantly supporting the heavy resin soaked tubular member by liquid as it moves along the passageway is that it is kept out of frictional contact with the bottom of the passageway which alreadly has been lined and damage to the previously lined portion before the resin sets hard is avoided. Depending upon the amount and weight of the resin being used, upon the size of the passageway and upon the liquid which supports the resin soaked tubular member, the member may be supported on the surface of the liquid, or may in fact be supported in it, i.e., held in suspension in the liquid. In the latter case, the passageway can be filled with the liquid.

The composite tubular structure comprising the impermeable tube and resin soaked tubular member may be fed down a supply pipe having an upper end into which the composite tubular laminate is fed and a lower end in register with the end of the underground pipeline.

One end of the composite tubular laminate is attached sealingly to the outside of the lower end of the supply pipe. The passageway can then be lined according to the preferred method of the invention by pouring water down the supply pipe to any desired level, and this not only forces the composite tubular structure to roll inside out in the pipeline but also supports this structure buoyantly as it passes along the passageway.

The water may fill the inside of the tubular structure and thereby will press it against the passageway surface to be lined, the uneverted portion being suspended in the water. Where the structure is partially filled with water and the structure floats thereon, the remainder of the structure may be filled with air under pressure.

After the complete lining of the pipeline, the impermeable tube can be removed by withdrawing the water and pulling out the tube from within the lined pipeline, at the same time removing any residual water and leaving the now rigid pipe in position.

The preferred method according to the present invention is suitable for the lining of gas pipelines of the order of as small as 8 inch diameter when the structure is filled with water or very large passageways such as sewers where water and air jointly are used to press the everted tubular structure to the passageway surface.

Embodiments of the present invention will now be described by way of example, with reference to the accompanying diagrammatic drawings, wherein FIG. 1 is a sectional side view of the end of a flexible composite tubular structure or laminate.

FIG. 2 is connected to the supply pipe;

Figure 1:
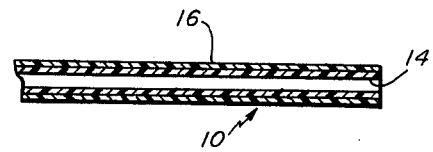
Figure 2:
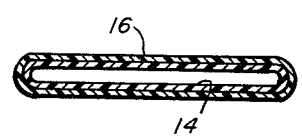
FIG. 2 is a sectional end view of the laminate shown in FIG. 1.

Referring to the drawings, and firstly to FIG. 1 and FIG. 2, in these Figures there is shown a flexible composite tubular laminate 10 which is made up of a tubular member 14 of an absorbant material such as fibrous material, for example a needled felt, or a woven material or other absorbent flexible structure, and this member 14 is wetted out with, so as to be immersed in, a synthetic resin such as an epoxy resin which sets hard or can be caused to set hard.

Surrounding the member 14 is a barrier tube 16 which is of water impermeable synthetic plastics material such as polythene or polyvinyl chloride.

Basically, the tube 14 forms the internal impact reinforcement of a pipe to line a pipeline and the barrier tube 16 may form part of the finished pipe or may be removed as desired.

Figure 3:
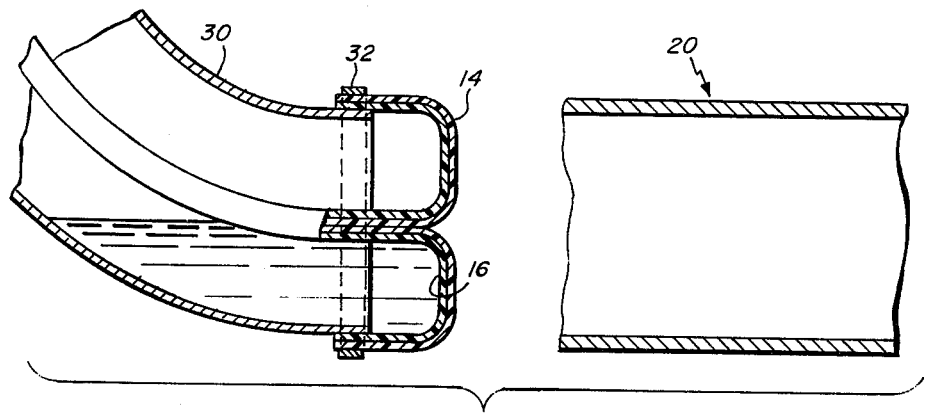
FIG. 3 is a sectional side view showing how the end of the laminate of FIG. 1
Figure 4:
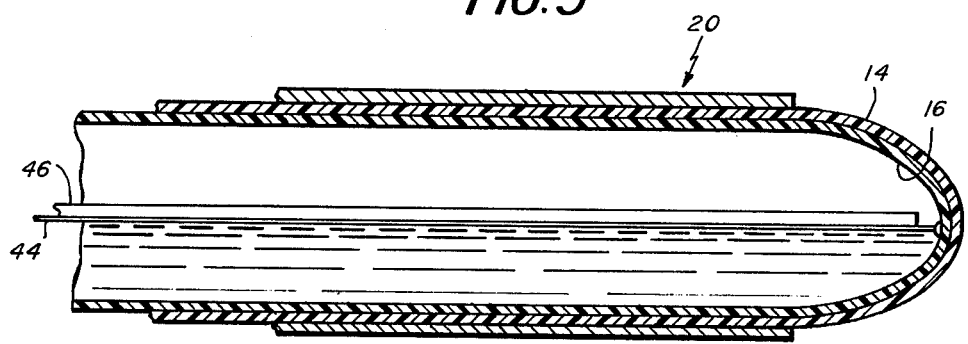
FIG. 4 is a sectional side view showing the remote end of the pipeline at completion of the operation positioning the laminate.
Figure 5:
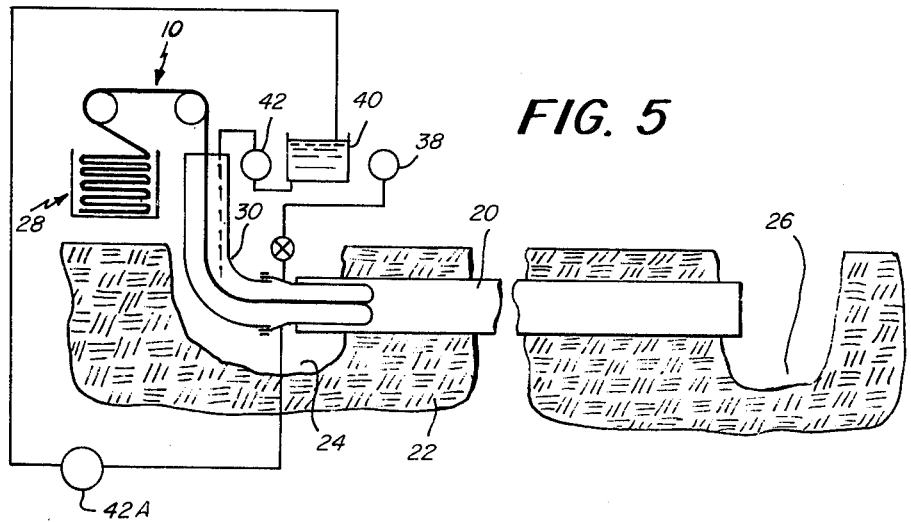
FIG. 5 is a sectional side view illustrating one embodiment of the overall method of insertion of the laminate.

The flexible tubular laminate 10 is made in or cut to the desired length to suit a particular length of pipeline, in the example of FIG. 3 to 5 a large underground pipeline having an internal diameter is much as in the region of 5 or 6 feet.

Referring now to FIG. 5, such a gas main pipeline is indicated by numeral 20, and it will be seen that this is disposed horizontally and is embedded within the ground 22.

The ground is excavated as shown as 24 and 26 to expose the ends of the length of pipeline to be lined.

According to this embodiment of the invention, the composite laminate is introduced from one end of the pipeline 20, in this example from the left hand end in FIG. 5.

In the diagrammatic representation of FIG. 5, it will be seen that the laminate 10 is supplied in folded condition in a container 28 which may be refrigerated if desired in order to maintain the synthetic resin in the fluid state, and from this container 28 the laminate is fed through a rigid supply pipe 30 and into the pipeline 20.

FIG. 3 shows how the leading end of the laminate 10 is connected to the lower end of the supply pipe 30. The end of the laminate 10 is folded back upon itself so as to wrap round the outside of the lower end of pipe 30 and a sealing clamp 32 is applied to such folded back end in order sealingly to clamp the laminate to the lower end of the tube 30 as shown in FIG. 3.

In order to insert the laminate in the pipeline 20 liquid as shown in FIG. 5 is poured into the supply pipe 30; the liquid for example water, being cooled or warmed as desired, depending upon the resin being used, and it is supplied from a reservoir 40 by means of a delivery pump 42 (see FIG. 5). This liquid forces the laminate 10 out of the lower end of pipe 30 and into the pipeline 20 turned inside out as it does as shown in FIG. 5, applying the wetted out fibrous tube 14 to the inside of the pipeline 20. The composite laminate is shown as floating along the interior of the passageway to the point where the liner is in the process of turning inside out is supplied. This is very desirable as the heavy laminate floating on the water would damage the already everted portion of the laminate at the bottom of the pipeline if it were simply dragged over it. It is assumed that the laminate will float by using a resin such that the specific gravity of the laminate is less than that of the water on which the laminate floats, to assist in turning the laminate inside out, the space above the water level in the interior of the passageway is filled with air or gas under pressure. A source of air under pressure 38 and a control valve are provided for this purpose.

FIG. 4 shows the outlet end of the pipeline 20 after the turning inside out operation of the laminate has been completed. It will be seen that the trailing end of the outer barrier tube is in fact sealed and has connected thereto a pull back rope or cable 44 which also carries a circulation pipe 46. This circulation pipe can be used to control the temperature of the water contained within the tube 16 and it can also serve to remove the water from the pipe 30 at the end of the lining operation. Removal of this water may be by a removal pump 42A, as shown in FIG. 5. The tube 16, and residual water therein can be removed from the inside of the passageway after the lining tube 14 has set hard, by pulling out cord or cable 44, causing the tube 16 to roll out of the passageway in a reverse manner.

When the resin eventually is cured and set there is formed a hard rigid resin pipe in the pipeline in which the felt 14, is embedded.

The depth of water required to feed in the tube assembly 10 may be quite small but yet this method, when air under pressure is used above the water level, has the advantage of ensuring that all air in the pipeline is forced along the pipeline and out of the outlet end and will not become trapped between the pipeline and the sheath 14 regardless of the fact that the pipeline may be slightly curved or bent or distorted in a vertical and/or horizontal plane.

Figure 6:
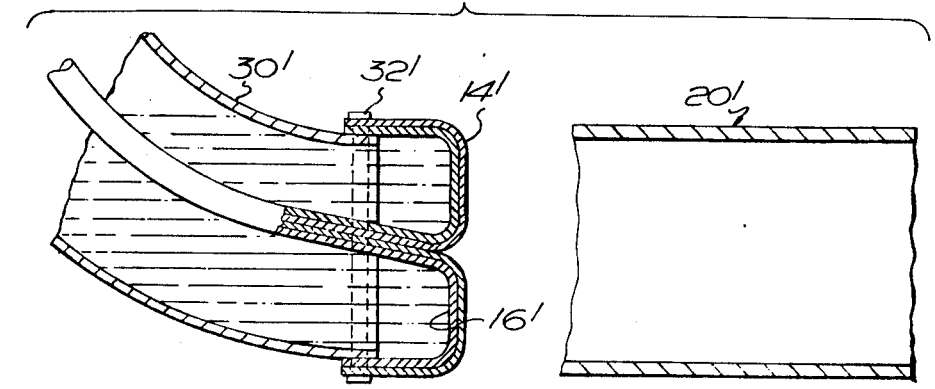
FIGS. 6, 7, and 8 are views similar to FIGS. 3, 4 and 5, but show an alternative method of inserting the laminate.
Figure 7:
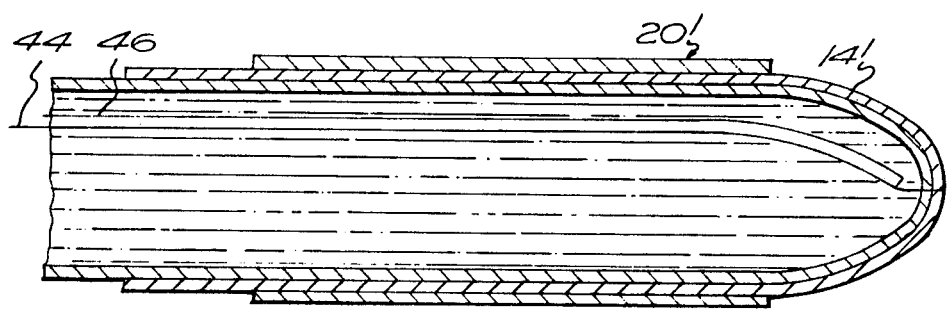
Figure 8:
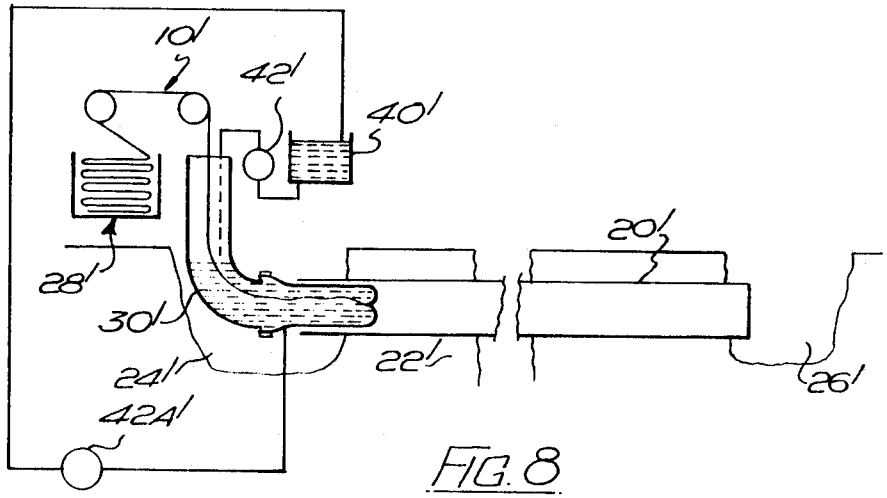

FIGS. 5, 7 and 8 show an alternative embodiment of the invention, suitable for use in applying a rigid lining pipe to the interior of a small diameter pipeline. The basic difference between this embodiment and the FIGS. 3 to 5 embodiment is that the "floating" liquid fills the interior of the everted laminate and the laminate which is travelling through the pipeline prior to being everted is suspended buoyantly in the liquid. This is achieved by selecting the specific gravity of the laminate with its resin to be fractionally greater than the liquid specific gravity so that the laminate will reach a buoyant position submerged in the liquid as shown in FIGS. 6 and 8.

The apparatus used and componets present in this embodiment are essentially the same as in the embodiment of FIGS. 3 to 5 and therefore the same reference numerals, but with the addition of a prime, have been used.

In each embodiment the "floating" in of the assembly in the water overcomes otherwise serious problems of friction of the heavy wetted out assembly being dragged along the bottom of the passageway.

The tubular laminate may be carried on a floating vessel as it moves along the passageway, before being turned inside out.

I claim:
1. A method of lining a passageway with a rigid protective lining by inserting into the passageway from one end thereof a fluid impermeable evertible tubular membrane having encased therein an evertible tubular lining of resin absorbent material impregnated with a polymerizable synthetic resin, the method comprising the steps of
    1. anchoring the evertible tubular membrane and the evertible lining at one end of the passageway in a manner permitting the uneverted tubular membrane with its encased lining to pass into the passageway through the anchored fluid impermeable tubular membrane whereby the tubular membrane and the lining evert as they progress into the passageway,
    2. causing the tubular membrane and the encased lining to move into the passageway by applying fluid pressure to the interior of the everted tubular membrane, and

3. buoyantly supporting the weight of the everted tubular membrane and the encased impregnated lining by filling the everted tubular membrane with a liquid whose specific gravity is so related to the weight of the tubular membrane and the encased impregnated lining that the uneverted tubular membrane and the encased impregnated lining are suspended in a buoyant position submerged in the liquid.

2. A method of lining a passageway with a rigid protective lining by inserting into the passageway from one end thereof a fluid impermeable evertible tubular membrane having encased therein an evertible tubular lining of resin absorbent material impregnated with a polymerizable synthetic resin, the method comprising the steps of
 1. anchoring the evertible tubular membrane and the evertible lining at one end of the passageway in a manner permitting the uneverted tubular membrane with its encased lining to pass into the passageway through the anchored fluid impermeable tubular membrane whereby the tubular membrane and the lining evert as they progress into the passageway,
 2. causing the tubular membrane and the encased lining to move into the passageway by applying fluid pressure to the interior of the everted tubular membrane,
 3. causing the uneverted tubular membrane and the encased lining to be buoyantly supported by a liquid within the everted tube as the uneverted tubular membrane and the encased lining progress along the passageway by partially filling the everted tubular membrane with the liquid, the weight of the uneverted tubular membrane and the encased resin impregnated lining being such as to cause the uneverted tubular membrane to float on the liquid, and
 4. filling the remainder of the interior of the everted tubular membrane with a pressurized gaseous medium.

3. A method of lining an underground passageway with a rigid protective lining by inserting into the passageway from one end thereof a fluid impermeable evertible tubular membrane having encased therein an evertible tubular lining of resin absorbent material impregnated with a polymerizable synthetic resin, the method comprising the steps of
 1. anchoring the evertible tubular membrane and the evertible lining at one end of the passageway in a manner permitting the uneverted tubular membrane with its encased lining to pass into the passageway through the anchored end of the fluid impermeable tubular membrane whereby the tube and the lining evert as they progress into the passageway,
 2. continuously feeding the inverted tubular membrane and encased lining from ground level to said one end of the passageway to enable the tubular membrane and encased lining progressively to evert into and along the passageway by supplying liquid from ground level to fill the everted tubular membrane and to surround the uneverted portion of the tubular membrane extending from ground level to said one end of the passageway whereby the liquid forces the tubular membrane and encased lining to move along and evert in the passageway thereby lining same, the specific gravity of the liquid being chosen in relation to the weight of the uneverted tubular membrane and the impregnated lining so that the uneverted tubular membrane and the encased impregnated lining are supported in a buoyant position submerged in the liquid as they pass along the passageway.

* * * * *